(12) United States Patent
Miftakhutdinov (10) Patent No.: US 6,646,425 B2
(45) Date of Patent: Nov. 11, 2003

(54) MULTI-CELL VOLTAGE REGULATOR AND METHOD THEREOF

(75) Inventor: Rais Miftakhutdinov, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/080,307

(22) Filed: Feb. 21, 2002

(65) Prior Publication Data

US 2003/0155897 A1 Aug. 21, 2003

(51) Int. Cl.[7] .............................. G05F 1/40; H05K 1/14
(52) U.S. Cl. ...................... 323/285; 323/268; 361/794
(58) Field of Search ............................... 323/282, 283, 323/284, 285, 286, 280, 268, 272; 363/71, 72, 65, 67; 307/91, 89; 361/762, 794, 782, 792

(56) References Cited

U.S. PATENT DOCUMENTS

| | | | |
|---|---|---|---|
| 5,008,795 A | | 4/1991 | Parsley et al. |
| 5,428,523 A | * | 6/1995 | McDonnal .................... 363/71 |
| 5,477,132 A | | 12/1995 | Canter et al. |
| 5,717,319 A | * | 2/1998 | Jokinen ....................... 323/280 |
| 5,870,296 A | | 2/1999 | Schaffer |
| 5,875,104 A | | 2/1999 | Prager |
| 6,031,361 A | | 2/2000 | Burstein et al. |
| 6,043,634 A | | 3/2000 | Nguyen et al. |
| 6,100,676 A | | 8/2000 | Burstein et al. |
| 6,137,274 A | | 10/2000 | Rajagopalan |
| 6,144,194 A | * | 11/2000 | Varga ......................... 323/285 |
| 6,166,457 A | * | 12/2000 | Iguchi et al. ................. 307/91 |
| 6,418,031 B1 | * | 7/2002 | Archambeault ............. 361/762 |

OTHER PUBLICATIONS

Panov, Yuri, et al. "Design Considerations for 12–V/1.5–V, 50–A Voltage Regulator Modules", IEEE Transactions on Power Electronics, vol. 16, No.6, pp. 776–783, Nov. 2001.
Lee, Fred C., et al. "Power Management Issues for Future Generation Microprocessors", IEEE, pp. 27–33, 1999, No. date.
Huang, Wenkang, et al. "Analysis and Design of Multi–Phase Synchronous Buck Converter with Enhanced $V^2$ Control", HFPC 2000 Proceedings, pp. 74–81, Oct. 2000.
Bau–Hung Lin, et al. "Analysis and Design of a Multiphase DC/DC Converter with Zero Voltage Transition", HFPC 2000 Proceedings, pp. 12–20, Oct. 2000.

* cited by examiner

Primary Examiner—Rajnikant B. Patel
(74) Attorney, Agent, or Firm—W. Daniel Swayze, Jr.; W. James Brady; Frederick J. Telecky, Jr.

(57) ABSTRACT

The present invention relates to multi-cell regulator systems and methods. Power supply delivery and regulation is provided to electronic devices disposed on a PCB board. A voltage regulator cell system is provided for a respective voltage regulation cell region, such that the supply voltage is regulated over the area of the power plane and the ground plane. The voltage regulator cell systems are provided with feedback loops at corresponding voltage regulation cell regions, which are compared with a reference voltage to adjust for difference errors. Various systems and methodologies are provided to obtain a desired reference voltage. Power supply delivery performance is further improved by accurate current sharing between voltage regulator cell systems.

30 Claims, 9 Drawing Sheets

MULTI-CELL VOLTAGE REGULATOR AND METHOD THEREOF

TECHNICAL FIELD

The present invention relates to electrical circuits and more particularly to power supply regulation of digital electronic systems.

BACKGROUND OF INVENTION

A variety of voltage regulators are commonly used today to provide tight static and dynamic tolerance supply voltages to digital electronic systems. Typically, high performance digital electronic systems for computer, communication and industrial applications include many large digital integrated circuits (e.g., microprocessors, digital signal processors, memory). The processing power, clock frequency, size and power consumption of these digital semiconductor devices are constantly increasing. Additionally, due at least in part to thermal, signal integrity and reliability issues, these types of digital devices require much lower supply voltages with tight static and dynamic tolerances. For example, there are estimations that high-end microprocessors with a clock frequency of about 3.5 GHz could have a core voltage as low as 1.2V with peak-to-peak tolerances of only 72 mV and consume 130A of current. During operation, such processors could have transitions from "sleep" mode of operation to maximum performance and backwards in just a few nanoseconds. That means that the thermal, electrical and mechanical problems need to be controlled for reliable and cost effective powering of such digital electronic systems.

Typically, large digital integrated circuits are located on multi-layer printed circuit boards (PCBs). Different supply voltages can be required for different portions of the printed circuit boards. For example, the core, the input interfaces, the output interfaces and other portions of the PCB can require different supply voltages. In most cases, the core consumes the most amount of power and has the tightest requirements for dynamic and static tolerance. Furthermore, there are digital systems where many large digital integrated circuits are used. These digital integrated circuits have packages with hundreds and sometimes thousands of pins that occupy relatively large areas of the PCB. Many of these pins are dedicated to the supply voltage and ground, and electrically distributed throughout the package area. These pins are electrically connected to the power and ground planes, which are actually special dedicated layers of a multi-layer PCB. Special high-frequency AC decoupling capacitors are placed around the digital integrated circuit packages, and over the power plane area to reject high-frequency voltage spikes during the transients. A voltage regulator is located on the PCB to control static and dynamic voltage drops.

The power and ground planes and interconnections have parasitic inductance and resistance distributed all over the PCB area. During the high slew-rate transients of digital processing devices (e.g., DSP, microprocessor, controller), the distributed inductance and resistance causes significant voltage drops and as a result possible "glitches" of digital signals and false processing. The voltage regulator is located as close as possible to the processing devices to avoid significant voltage drop at high current and high slew-rate transients experienced by the digital processing devices. The control method of the regulator has to have fast load-current transient response without delays and limitations of duty cycle to decrease peak-to-peak voltage spikes through power and ground planes near the digital processing device pins. One example of a power delivery system for large current devices is a synchronous-buck converter with controller having negative feedback loop. However, these devices require large bulk capacitors and inductors for input and output filters for high currents (e.g., 30A). The large bulk capacitors and inductors occupy a large area and cannot be placed in close proximity to the digital processing devices.

Another solution is referred to as interleaved or multi-phase topology. In this solution, the switching regulator includes an n-channel interleaved synchronous buck converter with a controller. During the steady state operation, the control signals of each channel are delayed relative to each other by Ts/n, where Ts is a switching cycle of each channel and n is the total number of channels. Each channel conducts Io/n current where Io is the summarized output current. The interleaving of the current through output and input capacitors over Ts/n switching cycles, lowers the switching cycle of these currents. This decreases the value and number of output and input capacitors. Therefore, smaller components can be used and distributed through the multi-layer board area and placed closer to the digital processor.

In this solution, the regulator controls the voltage at one point of the power plane where the feedback is taken back to the controller. The static and dynamic regulation has to be tightly controlled to keep the voltage within the limits all over the plane area. Therefore, the power plane copper has to have increased thickness to decrease the resistive voltage drop, which is difficult to implement in a multi-layer PCB. A significant number of high frequency, decoupling capacitors have to be populated over the area of the power and ground plane to decrease the inductive voltage drop. Additionally, a very accurate current sharing mechanism has to be implemented to get low ripple effect through the input and output capacitors. The increased number of channels to meet the higher current requirements and the high switching frequency increase the difficulty in current sharing. Therefore, the control circuitry becomes very complicated. Any changes of load current requirements leads to a change in the number of channels or current through each channel resulting in a need for a complete redesign of the system.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to systems and methods for regulating power supply delivery to electronic devices disposed on a PCB board. The PCB board comprises a plurality of voltage or power regulation cell areas or regions based on current requirements of electronic devices at different portions of the PCB. A voltage regulator cell system is provided for a respective voltage regulation cell region, such that the supply voltage is regulated over the area of a power plane and a ground plane. The voltage regulator cell systems are provided with feedback loops at corresponding voltage regulation cell regions which are compared with a reference voltage to adjust for difference errors. A voltage regulator cell system regulates the voltage through a respective dedicated area of the power plane and the ground plane. Power supply delivery is improved by facilitating accurate current sharing between voltage regulator cell systems throughout the power and ground plane.

In one aspect of the invention, each voltage regulator cell system utilizes internal reference voltages of similar voltage values to regulate power delivery in a respective voltage regulation cell region. Alternatively, a single external reference voltage or a single internal reference can be employed for providing a reference voltage to each voltage regulator cell system. In another aspect of the invention, an output of one voltage regulator cell system is used as a reference voltage for one or more other voltage regulator cell systems. In yet another aspect of the invention, each voltage regulator cell system has its own reference voltage tied with the reference voltages of other voltage regulator cell systems. Thus, a more accurate average reference voltage is provided to the whole power delivery system.

Current sharing between the cells can be improved by predetermining the output impedance of each power regulator cell system. The selected output impedance controls the voltage regulation and peak-to-peak dynamic response within the power regulation cells during load current transients in a wide frequency bandwidth range. The output impedance can be provided by the circuitry that senses the current of each power regulation cell area and subtracts its output voltage, proportional to the current, from the reference voltage. If the voltage regulator cell system sources the current, a voltage proportional to the current is subtracted from the reference voltage. If the voltage regulator cell system sinks the current, the voltage proportional to the current is added to the reference voltage. The current sensing circuitry can be implemented by a voltage drop caused by a load current flowing through a selected droop resistor inserted between the output of voltage regulator cell system, and the point where the output voltage feedback signal is measured. In one aspect of the invention, the voltage regulator cell system is implemented as a synchronous buck converter switching supply. It is to be appreciated that other switching supplies can be employed in accordance with the present invention.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention relates to multi-cell regulator systems and methods. Power supply delivery and regulation is provided to electronic devices disposed on a PCB board. The PCB board is conceptually partitioned into a plurality of voltage regulation cell areas or regions based on current requirements at different portions of the PCB. A voltage regulator cell system is provided for a respective voltage regulation cell region, such that the supply voltage is regulated over the area of a power plane and a ground plane. The voltage regulator cell systems are provided with feedback loops at corresponding voltage regulation cell regions, which are compared with a reference voltage to adjust for difference errors. Various systems and methodologies can be employed to provide a desired reference voltage. Power supply delivery performance is further improved by accurate current sharing between voltage regulator cell systems throughout the power and ground plane of the PCB.

Figure 1:
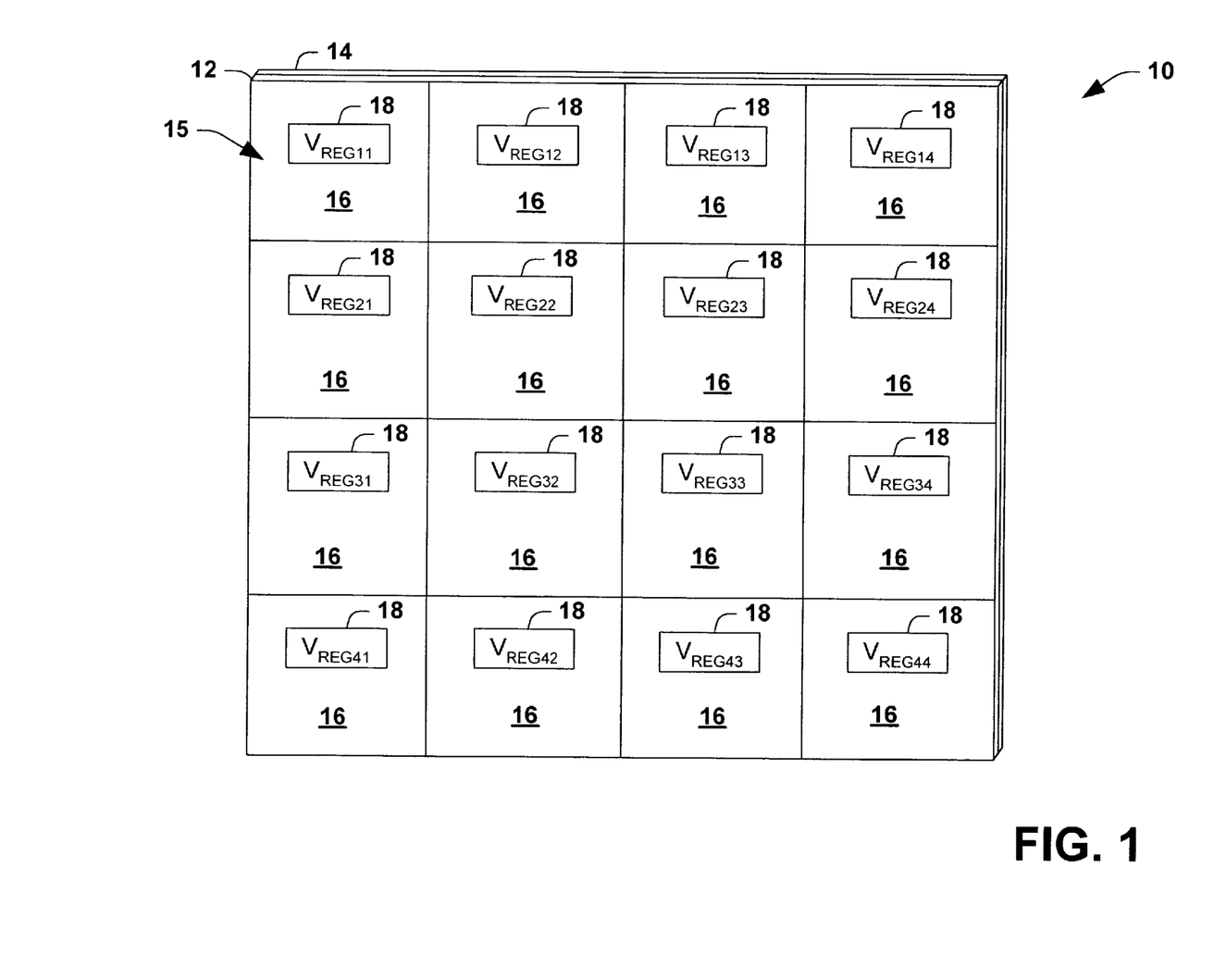
FIG. 1 illustrates a front perspective block diagram of a multi-cell voltage regulator system in accordance with an aspect of the present invention.

FIG. 1 illustrates a PCB 10 having a power plane 12 and a ground plane 14. The PCB 10 includes a plurality of voltage regulation cell areas 16. Each voltage regulation cell area 16 is provided with a voltage regulator cell system 18. The plurality of voltage regulator cell systems 18 combine to form a multi-cell voltage regulator system 15. The multi-cell voltage regulator system 15 is a power delivery system that regulates the voltage over the whole area of the power plane 12 and the ground plane 14, as opposed to at a single location on the PCB 10. Each voltage regulator cell system 18 has its own control circuitry and negative feedback loop. Each voltage regulator cell system 18 compares the voltage across its own cell area 16 of the power plane 12 and the ground plane 14 with a reference voltage (e.g., an internal reference voltage). If error is detected, the respective voltage regulator cell system 18 adjusts its output voltage properly to keep it approximately equal to the reference voltage.

In the example of FIG. 1, the PCB 10 includes a plurality of regulation cell areas 16 that include a plurality of respective voltage regulator cell systems 18, one for each regulation cell area 16. The plurality of voltage regulator cell systems 18 include voltage regulator cell systems $V_{REG(X,Y)}$ where X=1–4, and Y=1–4, such that the PCB 10 includes sixteen voltage regulation cell area 16 and sixteen voltage regulator cell systems 18. The voltage cell regulation areas 16 are essentially equivalent in size, so that the current provided by each voltage regulator cell system 18 is substantially equivalent. The actual number of regulation cell areas (N) is equal to the number of specified areas. The number of regulation cell regions and specified areas depends on the current ($I_O$) capability of each voltage regulator cell system, and the total current ($I_{DS}$) consumption by the digital electronic system (not shown) residing on the PCB 10. The number of regulation cell areas N can be defined by the equation $N > I_{DS}/I_O$.

Redundancy of N+1 regulator cell systems can also be implemented, for example, if the number of regulator cell systems is selected to be at least one more than N, and each regulator cell system is able to disconnect itself from the power plane 12 in case of failure. The multi-cell voltage regulator system 15 can be adapted to new current requirements for the digital system. Only the number of cell areas and voltage regulator cell systems has to be changed, while the components and total structure of the digital electronic system remains the same.

It is to be appreciated that different digital components draw different amounts of current at different time periods. Therefore, the area of the voltage regulation cell regions can be varied to account for current variation requirements, so that current drawn from the different voltage regulator cell systems remain substantially equivalent. Matching current drawn from each of the voltage regulator cell systems provides voltage regulator cell systems that operate within similar temperatures and efficiencies to facilitate maximizing performance for power delivery and regulation.

Figure 2:
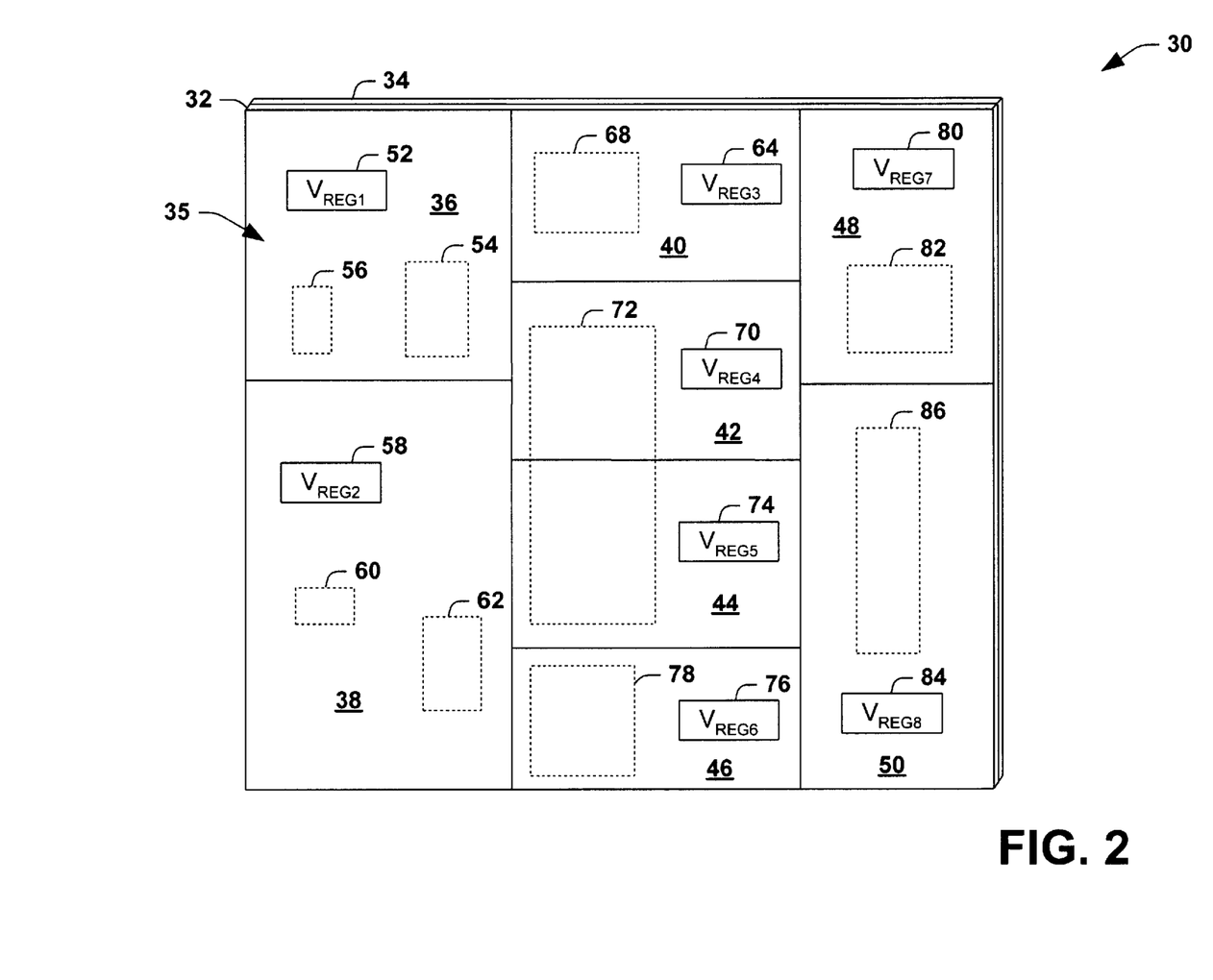
FIG. 2 illustrates a front perspective block diagram of a multi-cell voltage regulator system having voltage regulation cell regions of varying areas in accordance with an aspect of the present invention.

FIG. 2 illustrates a PCB 30 having a power plane 32 and a ground plane 34. The PCB 30 includes a plurality of voltage regulation cell areas 36, 38, 40, 42, 44, 46, 48 and 50 having different area sizes based on current drawn from devices in the respective area. Each voltage regulation cell area 36-50 is provided with a voltage regulator cell system 52, 58, 64, 70, 74, 76, 80, 84, respectively. The plurality of voltage regulator cell systems 52, 58, 64, 70, 74, 76, 80, and 84 combine to form a multi-cell voltage regulator system 35. The multi-cell regulator system 35 is a power delivery system that regulates the voltage over the whole area of the power plane 32 and the ground plane 34. Each voltage regulator cell system 52, 58, 64, 70, 74, 76, 80, and 84 has its own control circuitry and negative feedback loop. Each voltage regulator cell system compares the voltage across its own cell area or region of the power plane 32 and the ground plane 34 with a reference voltage. If there is some error, the respective voltage regulator cell system adjusts its output voltage properly to keep it approximately equal to the reference voltage.

In the example of FIG. 2, a first cell region 36 includes electronic devices 54 and 56 and a first voltage regulator cell system 52 ($V_{REG1}$), and a second cell region 38 includes electronic devices 60, 62 and a second voltage regulator cell system 58 ($V_{REG2}$). The electronic devices 54, 56, 60 and 62 can be amplifier devices, logic devices, timing devices or the like. The electronic devices 54, 56, 60 and 62 can be digital and/or analog devices. A third cell region 40 includes electronic device 44 and a third voltage regulator cell system 64 ($V_{REG3}$), a sixth cell region 46 includes electronic device 78 and a sixth voltage regulator cell system 76 ($V_{REG6}$), and a seventh cell region 48 includes electronic device 82 and a seventh voltage regulator cell system 80 ($V_{REG7}$). The electronic devices 68, 78 and 82 can be, for example, memory devices. An eighth cell region 50 includes an electronic device 86, which can be for example a driver device, and an eighth voltage regulator cell system 84.

A fourth cell region 42 and a fifth cell region 44 includes a fourth voltage regulator cell system 70 ($V_{REG4}$) in the fourth region 42, and a fifth voltage regulator cell system 74 ($V_{REG5}$) in the fifth region 44. The fourth voltage regulator cell system 70 and the fifth voltage regulator cell system 74 are operative to provide power to a larger electronic device 72, such as a microprocessor or DSP. The area of the cell regions are selected to be able to provide current to electronic devices in respective cell regions that does not result in variation of the operating characteristics of one voltage regulator cell system with respect to the other voltage regulator cell systems.

Figure 3:
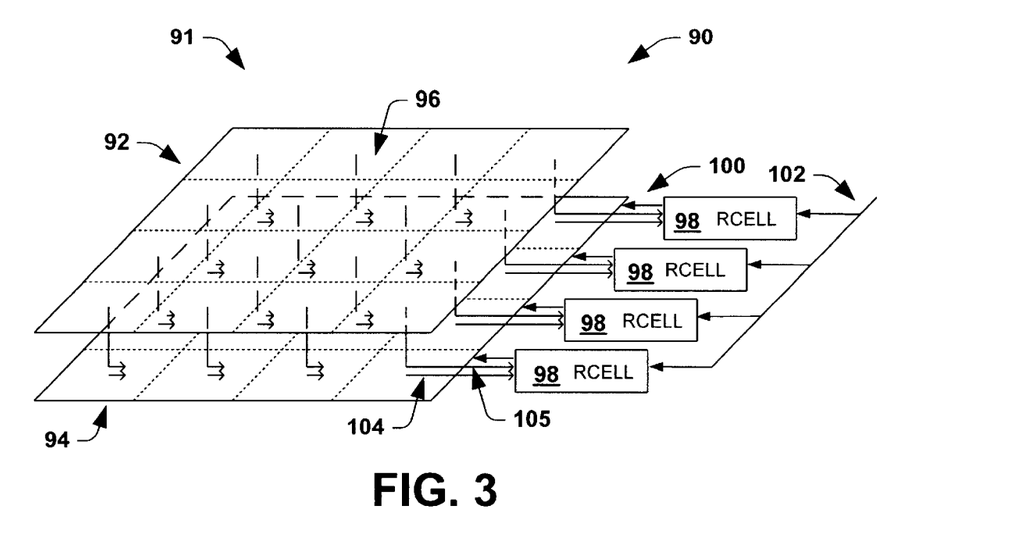
FIG. 3 illustrates a perspective representation of a multi-cell voltage regulator system using individual internal reference voltage sources in accordance with an aspect of the present invention.

FIG. 3 illustrates a perspective representation of a multi-cell voltage regulator system 90 using individual internal reference voltage sources for error difference correction of voltage regulator cell systems in accordance with an aspect of the present invention. A PCB board 91 includes a power plane 92 and a ground plane 94. The power plane 92 and the ground plane 94 include a plurality of voltage regulation cell areas 96. Each regulation cell area 96 has a dedicated voltage regulator cell system 98 (RCELL) with its own control circuitry and negative feedback loop. The voltage regulator cell systems 98 are provided with a power input 102, which is typically an unregulated power supply input. Each voltage regulator cell system 98 generates a dedicated regulated voltage output 100 to a respective regulation cell area 96. Each voltage regulator system 98 compares the voltage across its respective voltage regulation cell area 96 of the power plane 92 and the ground plane 94, using the voltage across a respective feedback power signal 105 and a respective feedback ground signal 104 with an internal reference voltage source. If there is some error, the voltage regulator cell system 98 adjusts its output voltage properly to provide an output voltage substantially equal to the internal reference voltage source. Each internal reference voltage source is trimmed with the high accuracy, so that unequal current sharing between the voltage regulator cell systems 98 does not occur.

Figure 4:
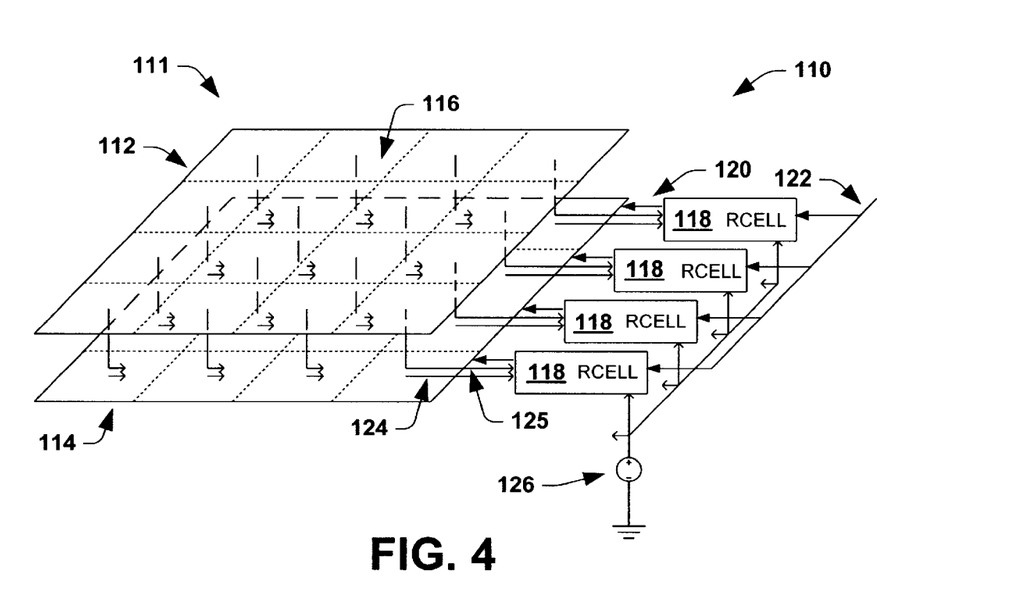
FIG. 4 illustrates a perspective representation of a multi-cell voltage regulator system using a single external reference voltage source in accordance with an aspect of t he present invention.

FIG. 4 illustrates a perspective representation of a multi-cell voltage regulator system 110 using a single external reference voltage source for error correction of a plurality of voltage regulator cell systems in accordance with an aspect of the present invention. A PCB board 111 includes a power plane 112 and a ground plane 114. The power plane 112 and the ground plane 114 include a plurality of regulation cell areas 116. Each regulation cell area 116 has a dedicated voltage regulator cell system 118 (RCELL) with its own control circuitry and negative feedback loop. The voltage regulator cell systems 118 are provided with a power input 122, and generate a dedicated regulated voltage output 120 to a respective regulation cell area 116. Each voltage regulator system 118 compares the voltage across its respective voltage regulation cell area 116 of the power plane 112 and the ground plane 114, using a voltage across a respective feedback power signal 125 and a respective feedback ground signal 124, with an external reference voltage 126. If there is some error, the voltage regulator cell system 118 adjusts its output voltage properly to provide an output voltage 120 substantially equal to the external reference voltage 126.

The external reference voltage 126 is applied to each voltage regulator cell system 118, which regulates its output voltage 120 to the external reference voltage 126. Since each voltage regulator cell system 118 adjusts its output voltage 120 to the same voltage reference level, a substantially equal voltage level over the whole plane area can be facilitated, which improves current sharing between the cell areas. Additionally, the voltage level over the power and ground plane can be set to different levels, or varied if it is necessary for the effective operation of the whole electronic device system. This can be accomplished by changing or modifying the external reference voltage source 126.

Figure 5:
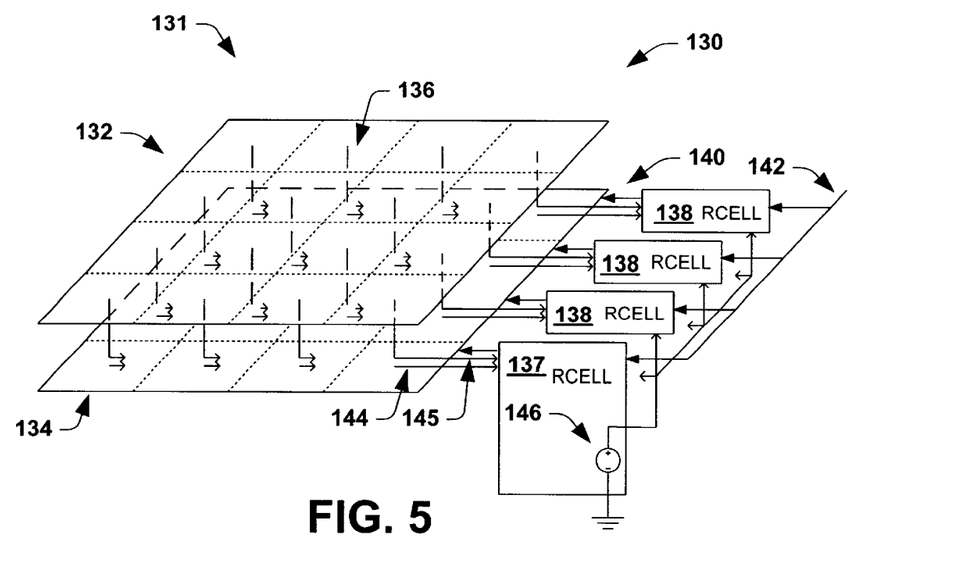
FIG. 5 illustrates a perspective representation of a multi-cell voltage regulator system using a single internal reference voltage source in accordance with an aspect of the present invention.

FIG. 5 illustrates a perspective representation of a multi-cell voltage regulator system 130 using a single internal reference voltage source for error correction of a plurality of voltage regulator cell systems in accordance with an aspect of the present invention. A PCB board 131 includes a power plane 132 and a ground plane 134. The power plane 132 and the ground plane 134 include a plurality of regulation cell areas 136. Each regulation cell area 136 has a dedicated voltage regulator cell system 138 (RCELL) with its own control circuitry and negative feedback loop. The voltage regulator cell systems 138 are provided with a power input 142, and generate a dedicated regulated output 140 to a respective regulation cell area 136. Each voltage regulator system 138 compares the voltage across its respective voltage regulation cell area 136 of the power plane 132 and the ground plane 134, using a voltage across a respective feedback power signal 145 and a respective ground feedback signal 144, with an internal reference voltage source 146 of a first regulator cell system 137. If there is some error, the respective regulator cell systems 137 and 138 adjust its respective output voltages properly to provide an output voltage 140 substantially equal to the internal reference voltage source 146.

Figure 6:
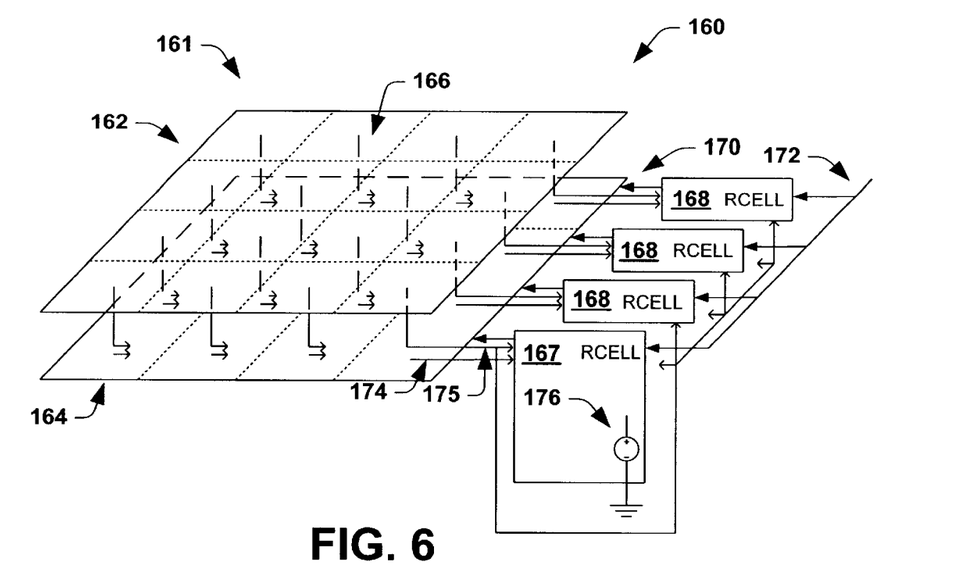
FIG. 6 illustrates a perspective representation of a multi-cell voltage regulator system using a first regulator system output as a reference voltage in accordance with an aspect of the present invention.

FIG. 6 illustrates a perspective representation of multi-cell voltage regulator system 160 using a first voltage regulator system output for error correction of a plurality of voltage regulator cell systems in accordance with an aspect of the present invention. A PCB board 161 includes a power plane 162 and a ground plane 164. The power plane 162 and the ground plane 164 include a plurality of regulation cell areas 166. Each regulation cell area has a dedicated voltage regulator cell system 168 (RCELL) with its own control circuitry and negative feedback loop. The voltage regulator cell systems 168 are provided with a power input 172, and generate a dedicated regulated output 170 to a respective regulation cell area 166.

Each voltage regulator cell system 168 compares the voltage across its respective voltage regulation cell area 166 of the power plane 162 and the ground plane 164, using a voltage across a respective feedback power signal 175 and a respective ground feedback signal 174, with an output of a first regulator cell system 167. If there is some error, the respective regulator cell systems 168 adjust its respective output voltages properly to provide an output voltage 170 substantially equal to the output voltage of the first regulator cell system 167. The first regulator system 167 uses its own internal reference voltage source 176 to correct for voltage difference errors. It is to be appreciated that the output of each voltage regulator cell system can be a reference voltage for each subsequent voltage regulator cell system.

Figure 7:
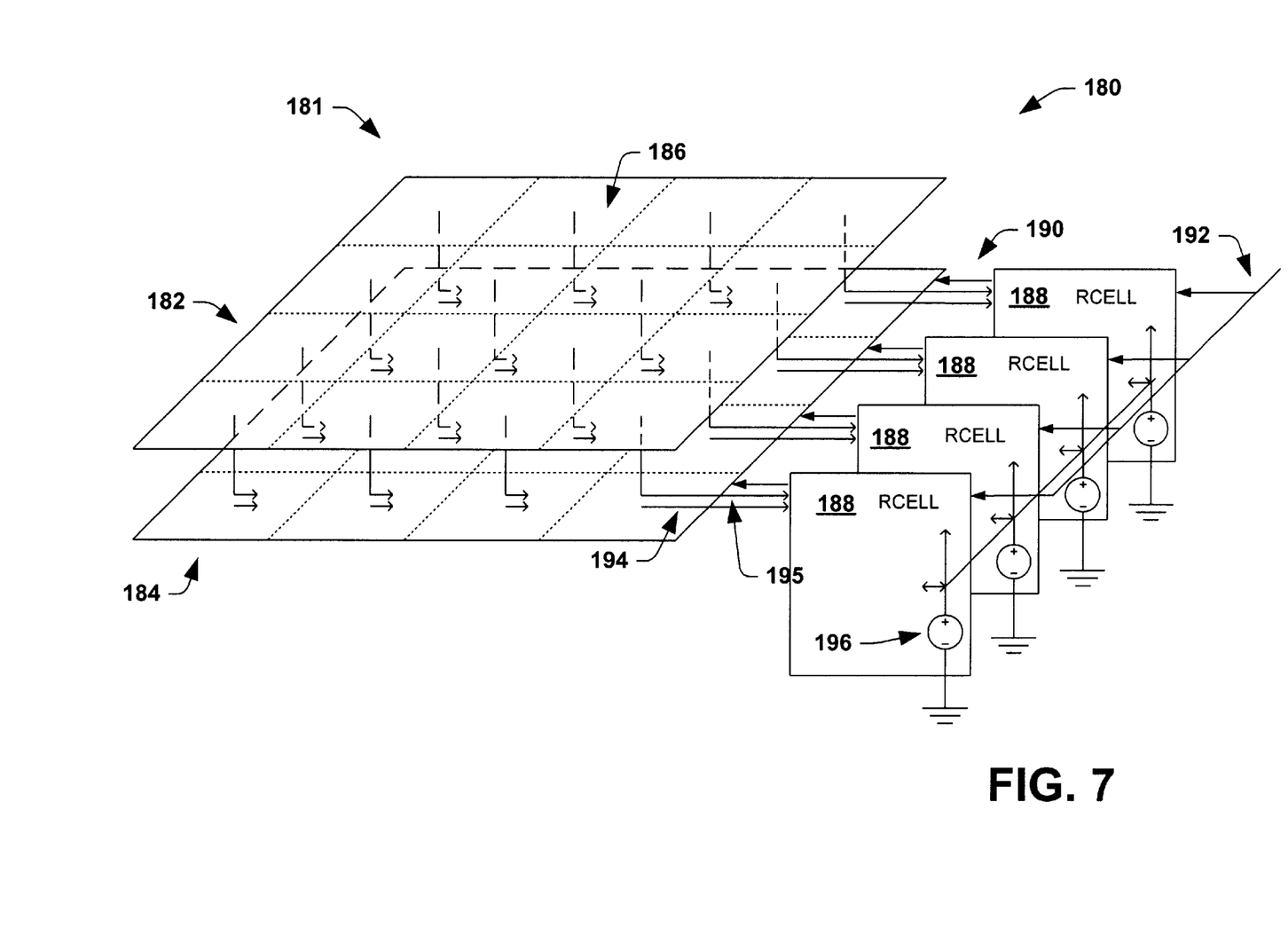
FIG. 7 illustrates a perspective representation of a multi-cell voltage regulator system using a plurality of internal reference voltage sources coupled together to provide an average reference voltage in accordance with an aspect of the present invention.

FIG. 7 illustrates a perspective representation of a multi-cell voltage regulator system 180 where an average reference voltage is provided for error correction of a plurality of voltage regulator cell systems in accordance with an aspect of the present invention. A PCB board 180 includes a power plane 182 and a ground plane 184. The power plane 182 and the ground plane 184 include a plurality of regulation cell areas 186. Each regulation cell area 186 has a dedicated voltage regulator cell system 188 (RCELL) with its own control circuitry and negative feedback loop. The voltage regulator cell systems 188 are provided with a power input 192, and generate a dedicated regulated output 190 to a respective regulation cell area 186. Each voltage regulator cell system 188 compares the voltage across its respective voltage regulation cell area 186 of the power plane 182 and the ground plane 184, using a voltage across a respective feedback power signal 195 and a respective feedback ground signal 194, with a common reference voltage source 196.

Each voltage regulator cell system 188 includes a reference voltage source 196. The reference voltages sources 196 of all voltage regulator cell systems 188 are tied together, and the average value of the reference voltage is applied to the voltage regulator cell systems 188. In this example, a common reference voltage source for each voltage regulator cell system 188 is more accurate because the reference voltages of many regulators with some tolerances are averaged. If there is some error, the respective regulator system 188 adjusts its output voltage properly to provide an output voltage 190 substantially equal to output of the average reference voltage of all the reference voltage sources 196.

Figure 8:
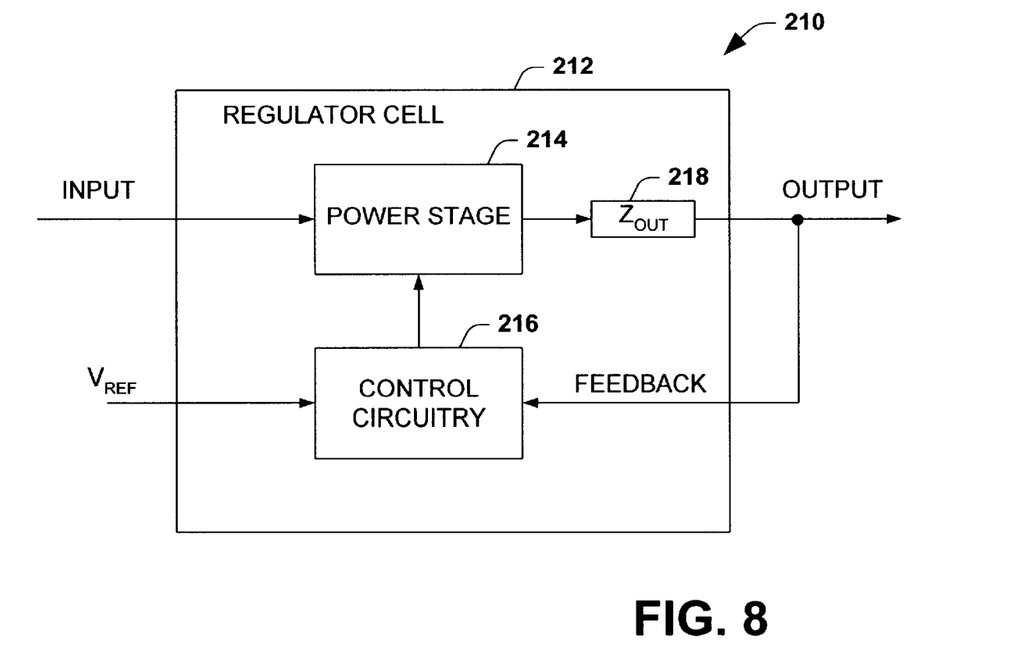
FIG. 8 illustrates block diagram of a voltage regulator cell system with a selected output impedance component in accordance with an aspect of the present invention.

FIG. 8 illustrates a voltage regulator cell system 212 of a multi-cell regulator system 210 in accordance with an aspect of the present invention. The voltage regulator cell system 212 includes a power stage 214, a control circuitry portion 216 and an output impedance component 218 ($Z_{OUT}$). The control circuitry portion 216 is arranged in a way to get accurate output impedance in a wide frequency range to further increase accuracy of current sharing between the voltage regulator cell systems. An unregulated power input signal (INPUT) is provided to the power stage 214, which provides a regulated output voltage (OUTPUT). Feedback of the output signal is provided to the control circuitry portion 216, which compares the output signal with a reference voltage $V_{REF}$. The control circuitry portion 216 adjusts the power stage 214 to compensate for any error differences in the reference voltage and the regulated output. The output feedback is provided after the selected output impedance component 218.

Figure 9:
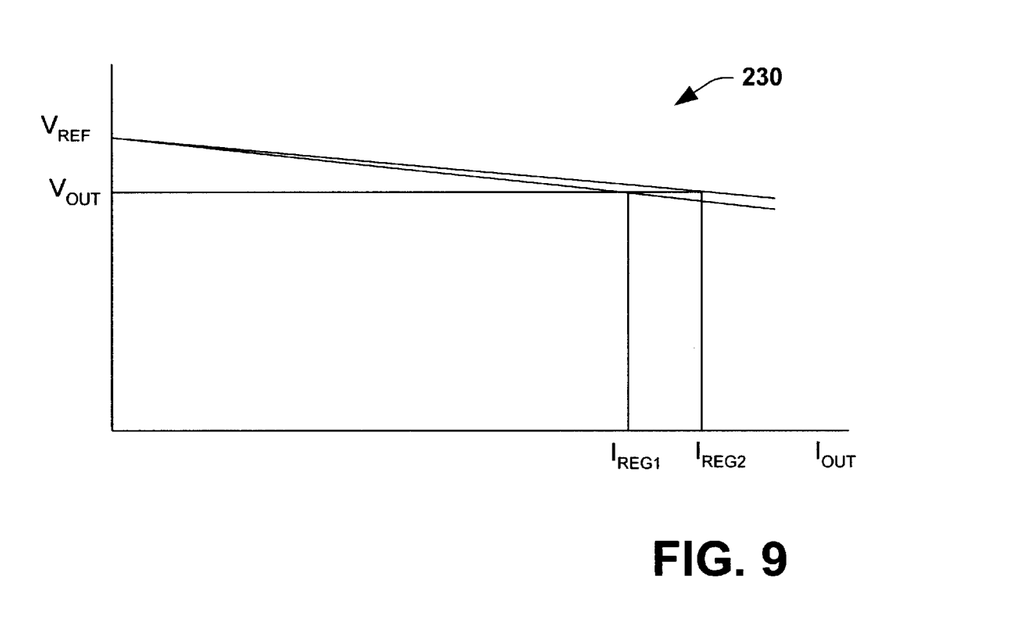
FIG. 9 illustrates a graph of out put voltage versus output current for two voltage regulator cell systems in accordance with an aspect of the present invention.

It is to be appreciated that an output current increase of one of the voltage regulator cell systems will result in a drop of its output voltage, thus, forcing the other voltage regulator cell systems to increase its share of current. FIG. 9 illustrates a graph 230 of output voltage ($V_{OUT}$) versus output current ($I_{OUT}$) of two voltage regulator cell systems. Since the reference voltage of the each voltage regulator cell system is substantially the same, the accuracy of current sharing depends for the most part on the differences of output impedance. Current sharing by using a fixed output impedance or droop current sharing is a relatively simple and accurate approach, and does not require additional interconnections between the voltage regulator cell systems.

Figure 10:
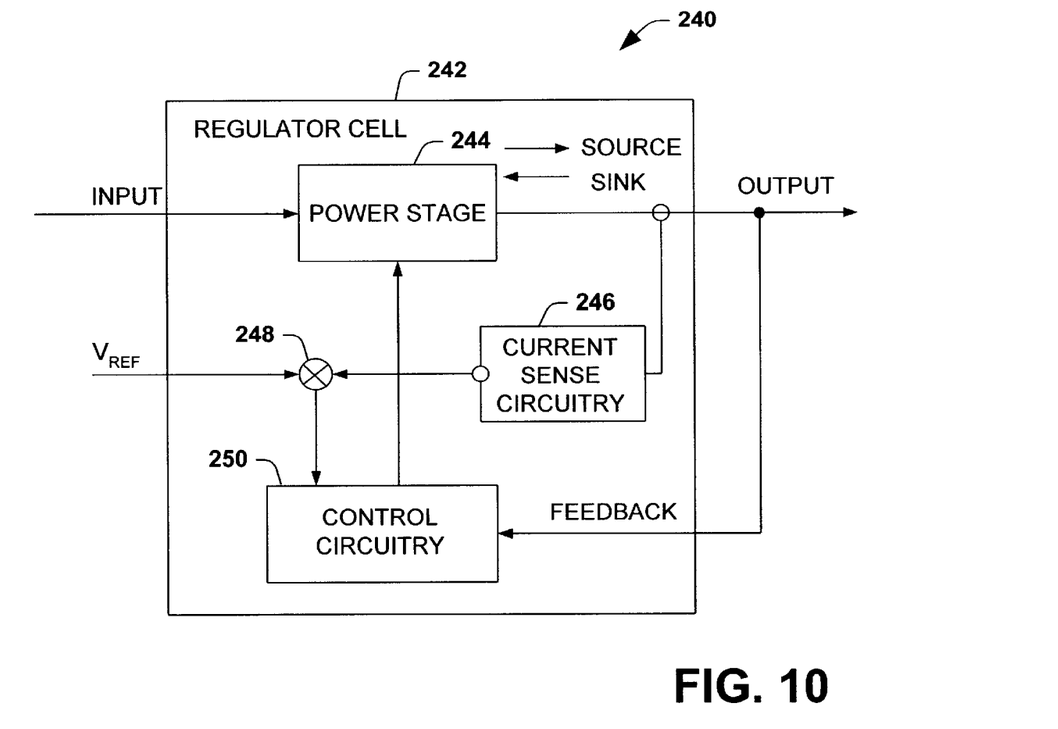
FIG. 10 illustrates block diagram of a voltage regulator cell system with a current sense circuitry component in accordance with an aspect of the present invention.

FIG. 10 illustrates a voltage regulator cell system 242 utilizing a current sense circuitry component 246 in accordance with an aspect of the present invention. The voltage regulator cell system 242 is part of a multi-cell regulator system 240. The voltage regulator cell system 242 includes a power stage 244, a control circuitry portion 250 and the current sense circuitry portion 246. An unregulated power input signal (INPUT) is provided to the power stage 244, which provides a regulated output voltage (OUTPUT). A predetermined output impedance can be accurately set by using the current sense circuitry 246. The output voltage of the current sense circuitry 246 is proportional to the output current of the voltage regulator cell system 242. The polarity of output of current sense circuitry 246 depends on the direction where the output current of voltage regulator cell system 242 flows. If the voltage regulator cell system 242 sources the current, the output signal of current sense circuitry 246 is subtracted from a reference voltage $V_{REF}$ using a summer component 248. If the regulator cell system 242 sinks the current, the output signal of current sense circuitry 246 is added to the reference voltage $V_{REF}$ using the summer component 248.

Figure 11:
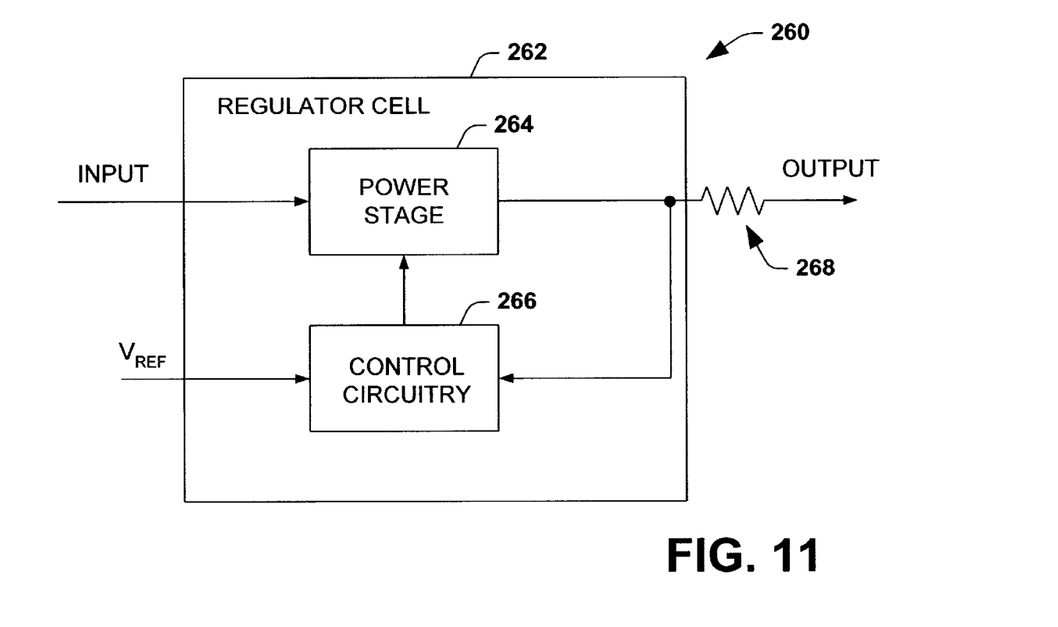
FIG. 11 illustrates a block diagram of a voltage regulator cell system with a droop resistor in accordance with an aspect of the present invention.

FIG. 11 illustrates a voltage regulator cell system 262 utilizing a droop resistor 268 in accordance with an aspect of the present invention. The voltage regulator cell system 262 is part of a multi-cell regulator system 260. The voltage regulator cell system 260 includes a power stage 264, a control circuitry portion 266 and the droop resistor 268. An unregulated power input signal (INPUT) is provided to the power stage 264, which provides a regulated output voltage (OUTPUT). The droop resistor 268 is added between the power stage 264 and output of the voltage regulator cell system 262. A feedback loop is taken from the connection point of the droop resistor 268 and the power stage 264. The droop resistor 268 provides accurate output impedance in a wide frequency range. The use of the droop resistor 268 also provides almost two times lower peak to peak output voltage transient response on load current step transitions in comparison with a low output impedance regulator as illustrated in FIG. 8.

Figure 12:
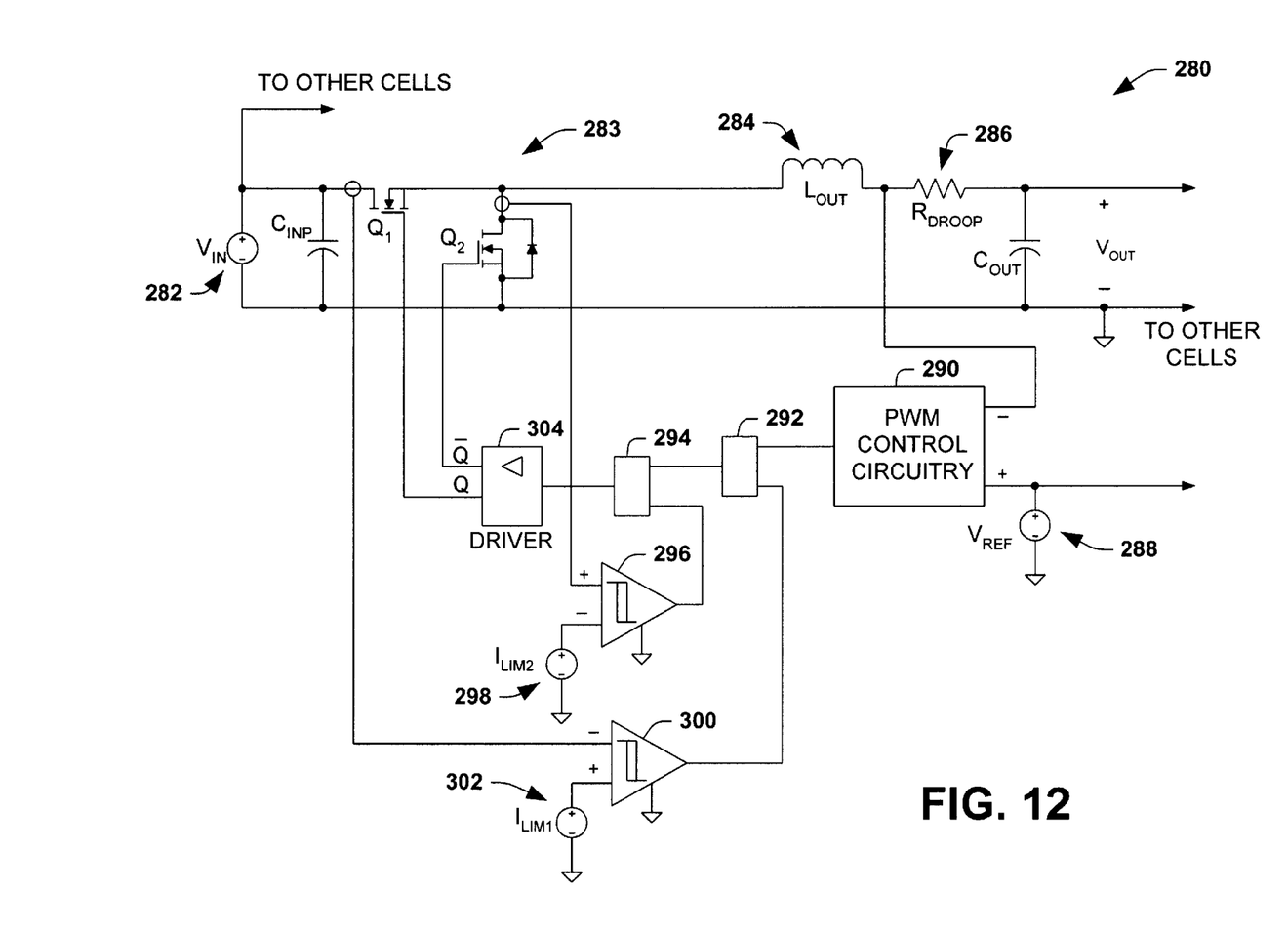
FIG. 12 illustrates a schematic block diagram of a synchronous buck converter in accordance with an aspect of the present invention.

Each regulator cell system in the multi-cell voltage regulator system is integrated and optimized to deliver maximum current to the available cell area for each cell region. It is important to have low power losses to keep the size and temperature of multi-cell voltage regulator system relatively low. One possible candidate for providing regulator voltage to the digital system of a PCB board is the synchronous buck converter. It is to be appreciated that this is but one possible example of how the regulator cell systems of the multi-cell voltage regulator can be implemented. FIG. 12 illustrates a synchronous buck converter 280 that provides a regulated voltage to a cell area or region of a multi-cell voltage regulator system in accordance with an aspect of the present invention.

The synchronous buck converter 280 includes a pulse width modulator control circuitry device 290 coupled to a driver device 304. The pulse width modulator device 290 and the driver device 304 are operative to control the duty cycle of pulses provided to a first transistor switch Q1 and a second transistor switch Q2. In the example of FIG. 12, the first transistor switch Q1 and the second transistor switch Q2 are N-type MOSFET devices coupled in series. The first transistor switch Q1 is coupled to an input voltage ($V_{IN}$) at its drain terminal and a node 283 at its source terminal. A capacitor $C_{INP}$ is provided between the input voltage $V_{IN}$ and ground to filter the input voltage $V_{IN}$ as it is received by the synchronous buck converter 280.

The second transistor switch Q2 is coupled to its drain terminal at the node 283 and to ground at its source terminal. The node 283 is also coupled to an inductor or winding $L_{OUT}$. The inductor $L_{OUT}$ provides the energy to charge a capacitor $C_{OUT}$. The pulse width modulator device 290 switches a control pulse to the driver device 304 which provides an input signal or switching signal causing the first transistor switch Q1 and the second transistor switch Q2 to turn "ON" and "OFF" in opposing states. The switching of the first and second transistor switches provides an input pulse signal, similar to a square wave, that toggles between the first transistor switch Q1 and the second transistor switch Q2 causing the node 283 to toggle between $V_{IN}$ and ground. Energy builds up in the inductor L1 when the first transistor switch Q1 is "ON", which is transferred to charge the capacitor $C_{OUT}$ to a voltage $V_{OUT}$.

A feedback signal of the output voltage $V_{OUT}$ between the inductor and a droop resistor ($R_{DROOP}$) 286 is fed back to the pulse width modulator 290 and compared with an internal reference voltage 288 $V_{REF}$. The pulse width modulator 290 utilizes the feedback signal to continuously adjust the duty cycle of the input signals driving the first and second transistor switches Q1 and Q2 and as a result regulating the output voltage $V_{OUT}$. The droop resistor approach is used for accurate current sharing in most conditions. During large signal transients, the maximum current of each synchronous buck converter cell has to be limited to some reasonable level. The cycle-by-cycle current limit is used to protect both the first transistor switch Q1 (high-side switch) and the second transistor switch Q2 (low-side switch). A first comparator device 300 and a first logic device 292 (e.g., logic AND device) limits current for the first or high-side switch Q1 by comparing the output current to a first current source ($I_{LIM1}$). A second comparator device 296 and a second logic device 294 (e.g., logic OR device) limits current for the second or low-side switch Q2 by comparing the output current to a second current source ($I_{LIM2}$).

Figure 13:
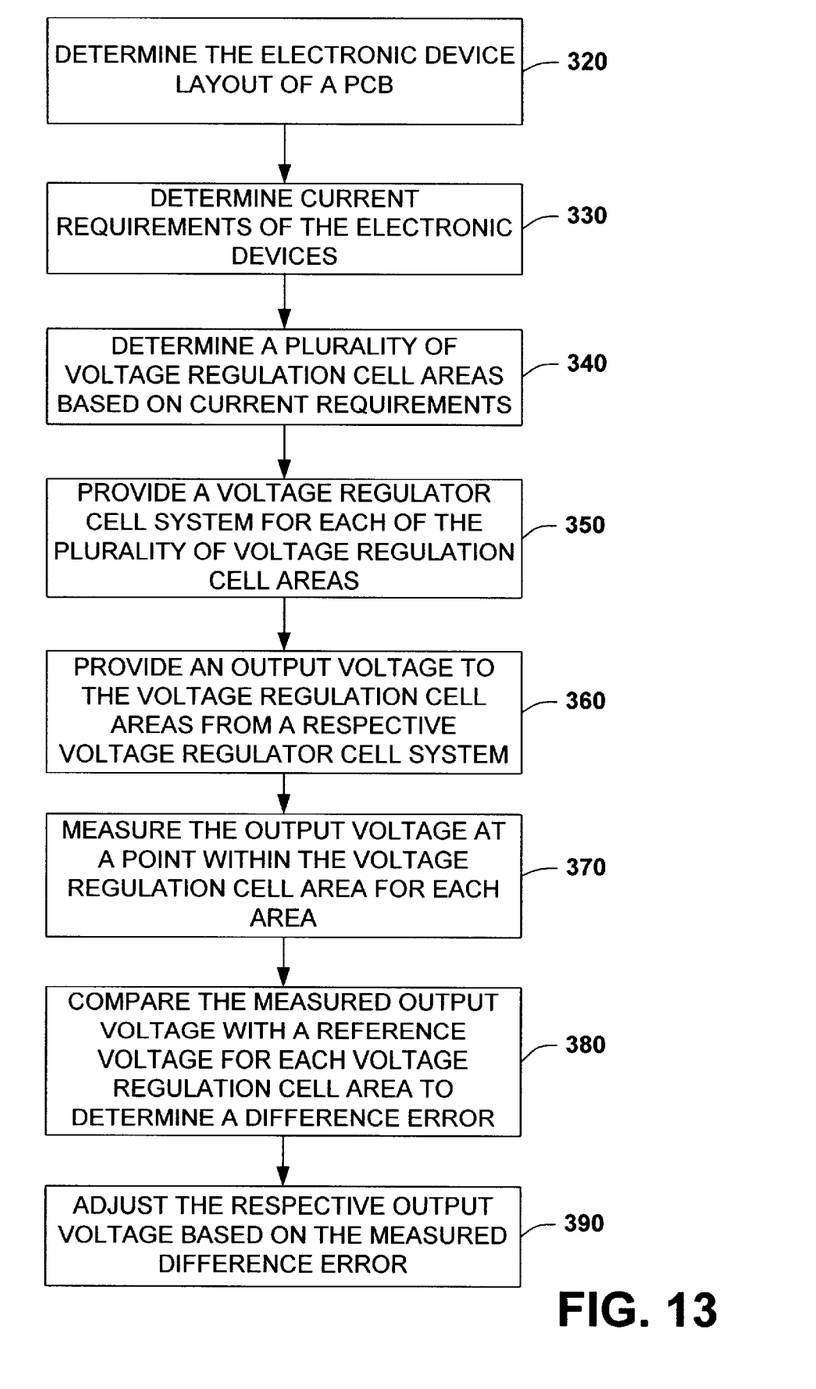
FIG. 13 illustrates a flow diagram of a methodology for voltage regulation on a PCB in accordance with an aspect of the present invention.

In view of the foregoing structural and functional features described above, a methodology in accordance with various aspects of the present invention will be better appreciated with reference to FIG. 13. While, for purposes of simplicity of explanation, the methodology of FIG. 13 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 13 illustrates one particular methodology for voltage regulation on a PCB in accordance with an aspect of the present invention. The methodology begins at 320 where the electronic device layout on a PCB is determined. At 330, the current requirements of the electronic devices are determined. At 340, a plurality of voltage regulation cell areas of the PCB are determined based on the current requirements. At 350, a voltage regulator cell system is provided for each of the plurality of voltage regulation cell areas. The voltage regulator cell system can be, for example, a synchronous buck converter. Circuitry can be provided to obtain a desired output impedance for at least one of the plurality of voltage regulator cell systems to facilitate current sharing between the plurality of voltage regulator cell systems. At 360, an output voltage is provided to each of the voltage regulation cell areas from a respective voltage regulator cell system.

At 370, the output voltage is measured at a point within the voltage regulation cell area for each area, and fed back to a respective voltage regulator cell system dedicated to the cell area. At 380, the measured output voltage is compared with a reference voltage for each voltage regulation cell area to determine a difference error. The reference voltage can be a dedicated or shared reference voltage. The reference voltage can also be an internal or an external reference voltage. A plurality of reference voltage sources can be coupled or tied together to provide an average reference voltage to the plurality of voltage regulator cell systems. Additionally, the output of one voltage regulator cell system can be used to provide a reference voltage to at least one other voltage regulator cell system. At 390, the respective output voltage is adjusted based on the measured difference error.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-cell voltage regulator system comprising:
   a printed circuit board having a power plane and a ground plane, the printed circuit board having a plurality of voltage regulation cell areas; and
   a plurality of voltage regulator cell systems operative to provide a regulated voltage at a respective voltage regulation cell area, each of the plurality of voltage regulator cell systems determining a difference error by comparing a feedback signal from a around point at the respective voltage regulation cell area to a reference voltage to regulate voltage within the respective voltage regulation cell area by a corresponding voltage regulator cell system.

2. The system of claim 1, the plurality of voltage regulation cell areas having substantially equal areas.

3. The system of claim 1, the plurality of voltage regulation cell areas having area sizes based on current drawn by electronic devices disposed on the printed circuit board.

4. The system of claim 1, a plurality of reference voltage sources provide the reference voltage to the plurality of voltage regulator cell system, such that each of the plurality of voltage regulator systems have a corresponding dedicated reference voltage source.

5. The system of claim 4, the plurality of reference voltage sources being one of internal voltage sources and external voltage sources.

6. The system of claim 4, the plurality of reference voltage sources being coupled to one another such that the reference voltage is an average voltage of the plurality of voltage reference sources.

7. The system of claim 1, an output of one of the plurality of voltage regulator cell systems being the reference voltage for at least one other of the plurality of voltage regulator cell systems.

8. The system of claim 1, further comprising a predetermined fixed output impedance component provided at the output of at least one of the plurality of voltage regulator cell systems to facilitate current sharing between the plurality of voltage regulator cell systems.

9. The system of claim 8, the predetermined fixed output impedance component being set by a current sense circuitry component.

10. The system of claim 8, the predetermined fixed output impedance component being a droop resistor.

11. The system of claim 1, at least one of the plurality of voltage regulator cell systems being a synchronous buck converter.

12. A printed circuit board having a plurality of electronic devices disposed thereon, the printed circuit board comprising:
    a plurality of voltage regulation cell regions; and
    a plurality of voltage regulator cell systems operative to provide a regulated voltage at a respective voltage regulation cell region, the plurality of voltage regulator cell systems having a predetermined fixed output impedance component to facilitate current sharing between the plurality of voltage regulator cell systems, and
    each of the plurality of voltage regulator cell systems utilizing a feedback signal from a ground point at a respective voltage regulation cell area and a reference voltage to regulate voltage within the respective voltage regulation cell area by a corresponding voltage regulator cell system.

13. The system of claim 12, the plurality of voltage regulation cell regions having areas based on current drawn by the electronic devices within the voltage regulation cell regions.

14. The system of claim 12, the predetermined fixed output impedance component being set by a current sense circuitry component.

15. The system of claim 12, the predetermined fixed output impedance component being a droop resistor.

16. The system of claim 12, at least one of the plurality of voltage regulator cell systems being a synchronous buck converter.

17. The system of claim 12, a plurality of reference voltage sources provides the reference voltage to the plurality of voltage regulator cell system, such that each of the plurality of voltage regulator systems have a corresponding dedicated reference voltage source.

18. The system of claim 17, the plurality of reference voltage sources being coupled to one another such that the reference voltage is an average voltage of the plurality of voltage reference sources.

19. The system of claim 12, an output of one of the plurality of voltage regulator cell systems being the reference voltage for at least one other of the plurality of voltage regulator cell systems.

20. A method for regulating voltage to a printed circuit board having a plurality of electronic devices disposed thereon, the method comprising:
    determining a plurality of voltage regulation cell areas of a printed circuit board;
    providing a voltage regulator cell system for each of the plurality of voltage regulation cell areas;
    providing a regulated output voltage at a respective voltage regulation cell area by a respective voltage regulator cell system; and
    determining a difference error for each regulator cell system by comparing a feedback signal from a ground point at the respective voltage regulation cell area to a reference voltage to regulate voltage within the respective voltage regulation cell area by a corresponding voltage regulator cell system.

21. The method of claim 20, further comprising adjusting the respective output based on the determined difference error.

22. The method claim 20, further comprising determining the electronic device layout of the printed circuit board and the current requirements of the electronic devices prior to determining a plurality of voltage regulation cell areas of a printed circuit board.

23. The method of claim 20, the reference voltage being provided by a plurality of reference voltage sources.

24. The method of claim 23, the plurality of reference voltage sources being one of internal voltage sources and external voltage sources.

25. The method of claim 23, further comprising coupling the plurality of reference voltage sources to one another such that the reference voltage is an average voltage of the plurality of voltage reference sources.

26. The method of claim 20, further comprising providing an output of one voltage regulator cell system as the reference voltage for at least one other voltage regulator cell system.

27. The method of claim 20, further comprising regulating the output impedance of at least one voltage regulator cell system.

28. The method of claim 27, the regulating the output impedance of at least one voltage regulator cell system comprising providing a predetermined fixed output impedance component at an output of the at least one voltage regulator cell system.

29. The method of claim 28, the predetermined fixed output impedance component being set by a current sense circuitry component.

30. The method of claim 28, the predetermined fixed output impedance component being a droop resistor.

* * * * *